US012596023B2

(12) United States Patent
Wang et al.

(10) Patent No.: US 12,596,023 B2
(45) Date of Patent: Apr. 7, 2026

(54) MICROMACHINED CAPACITIVE FLOW SENSOR, PACKAGED FLOW SENSOR PRODUCT COMPRISING THE SAME, AND METHOD THEREOF

(71) Applicant: GMEMS TECH SHENZHEN LIMITED, Shenzhen (CN)

(72) Inventors: Yunlong Wang, San Ramon, CA (US); Guanghua Wu, Dublin, CA (US); Maoxiang Guo, Milpitas, CA (US)

(73) Assignee: GMEMS Technologies, Inc., San Ramon, CA (US)

( * ) Notice: Subject to any disclaimer, the term of this patent is extended or adjusted under 35 U.S.C. 154(b) by 487 days.

(21) Appl. No.: 18/064,922

(22) Filed: Dec. 12, 2022

(65) Prior Publication Data

US 2024/0053179 A1 Feb. 15, 2024

Related U.S. Application Data

(60) Provisional application No. 63/371,382, filed on Aug. 12, 2022.

(51) Int. Cl.
G01F 1/58 (2006.01)
A24F 40/51 (2020.01)
G01F 1/28 (2006.01)
G01F 15/06 (2022.01)

(52) U.S. Cl.
CPC .............. G01F 1/588 (2013.01); A24F 40/51 (2020.01); G01F 1/28 (2013.01); G01F 15/06 (2013.01)

(58) Field of Classification Search
CPC . G01F 1/588; G01F 1/28; G01F 15/06; A24F 40/51

USPC .......................................................... 73/861
See application file for complete search history.

(56) References Cited

U.S. PATENT DOCUMENTS

| | | | | | |
|---|---|---|---|---|---|
| 9,968,132 | B2 * | 5/2018 | Hon | ........................ | A24F 40/51 |
| 2011/0138902 | A1 * | 6/2011 | White | .................... | H04R 1/406 73/147 |
| 2012/0275621 | A1 * | 11/2012 | Elko | .................... | H04R 19/016 381/92 |
| 2015/0305410 | A1 * | 10/2015 | Liu | ........................ | A24F 40/51 131/329 |

(Continued)

OTHER PUBLICATIONS

N.T. Nguyen, "Micromachined flow sensors—a review", May 23, 1997, Published in Flow Measurement Instruments, vol. 8, No. 1, pp. 7-16 (Year: 1997).*

*Primary Examiner* — Peter J Macchiarolo
*Assistant Examiner* — John M Royston
(74) *Attorney, Agent, or Firm* — George Guosheng Wang; Upstream Research and Patent LLC

(57) ABSTRACT

A micromachined capacitive flow sensor includes a movable membrane having one or more venting holes and a perforated backplate having perforation holes or through holes. A gas gap (such as an air gap) is formed between the movable membrane and the perforated backplate. The movable membrane, the gas gap and the perforated backplate form a variable capacitor whose capacitance varies with a movement of the membrane relative to the perforated backplate. The sensor may be used to manufacture a packaged flow sensor product which may find numerous applications, for example, using the product as a switch to turn on and off the electric power to the heating elements of the aerosol delivery device in response to the puff and/or smoking action of the user.

17 Claims, 14 Drawing Sheets

(56) References Cited

U.S. PATENT DOCUMENTS

2023/0064374 A1 * 3/2023 Leber ................. A61N 1/36185

* cited by examiner

MICROMACHINED CAPACITIVE FLOW SENSOR, PACKAGED FLOW SENSOR PRODUCT COMPRISING THE SAME, AND METHOD THEREOF

CROSS-REFERENCE TO RELATED APPLICATIONS

This application claims priority and related benefits under 35 U.S.C. Section 119(e) and Article 4 of the Stockholm Act of the Paris Convention for the Protection of Industrial Property of U.S. Provisional Patent Application No. 63/371, 382 filed on Aug. 12, 2022, which is incorporated herein by reference in its entirety.

FIELD OF THE INVENTION

The present invention generally relates to a micromachined capacitive flow sensor, a packaged flow sensor product comprising the same, and a method thereof.

BACKGROUND OF THE INVENTION

Electronic cigarette is a type of product that has similar appearance and taste as that of a conventional cigarette. The electronic cigarette, however, is better for health and more environmentally friendly than a conventional cigarette. As such, it is marketed as an alternative for cutting down the cigarette smoking.

In a typical electronic cigarette, an airflow sensor is provided in the body and is connected to an ASIC or a microcontroller. The airflow sensor generates a pulse signal when detecting a pressure drop in a smog passage of the electronic cigarette body as the user smokes. Generally, the airflow sensor is installed at a position close to inlet of fresh air to improve the sensitivity of detecting the smoking action of the user, thereby enabling the user to use the electronic cigarette more efficiently.

Sometimes the electronic cigarette is also referred to as an aerosol delivery device. The flow sensor or detector is used to control the supply of electric power to a heating element when aerosol generation is desired (e.g., upon draw during use). As such, for example, there is provided a manner or method for turning off the power supply to the heating element when the aerosol generating piece is not be drawn upon during use, and for turning on the power supply to actuate or trigger the generation of heat by the heat generation element during draw. For example, with respect to a flow sensor, representative current regulating components and other current controlling components including various ASICs, microcontrollers, sensors, and switches for aerosol delivery devices are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al.; U.S. Pat. No. 8,205,622 to Pan; and U.S. Pat. No. 8,881,737 to Collet et al.; U.S. Pat. Pub. Nos. 2009/0230117 to Fernando et al.; and 2014/0270727 to Ampolini et al.; and 2015/0257445 to Henry et al.; which are incorporated herein by reference in their entireties. Additional representative types of sensing or detection mechanisms, structures, components, configurations, and general methods of operation thereof, are described in U.S. Pat. No. 5,261, 424 to Sprinkel, Jr.; U.S. Pat. No. 5,372,148 to McCafferty et al.; and PCT WO 2010/003480 to Flick; which are incorporated herein by reference in their entireties.

Other suitable airflow actuation/deactuation mechanisms can include a temperature actuated on/off switch or a lip pressure actuated switch. An exemplary mechanism that can provide such puff-actuation capability includes silicon sensor manufactured by the MicroSwitch division of Honeywell, Inc., Freeport, Ill. With such sensor, the resistive heating element can be activated rapidly by a change in pressure when the consumer draws on the article. In addition, flow sensing devices, such as those using hot-wire anemometry principles, can be used to cause the energizing of the resistive heating element sufficiently rapidly after sensing a change in air flow. A further puff actuated switch that can be used is a pressure differential switch, such as Model No. MPL-502-V, range A, from Micro Pneumatic Logic, Inc., Ft. Lauderdale, Fla. Another suitable puff actuated mechanism is a sensitive pressure transducer (e.g., equipped with an amplifier or gain stage) which is in turn coupled with a comparator for detecting a predetermined threshold pressure. Yet another suitable puff actuated mechanism is a vane which is deflected by airflow, the motion of which vane is detected by a movement sensing means. Yet another suitable actuation mechanism is a piezoelectric switch. Also useful is a suitably connected Honeywell MicroSwitch Microbridge Airflow Sensor, Part No. AWM 2100V from MicroSwitch Division of Honeywell, Inc., Freeport, Ill.

U.S. Pat. No. 10,159,279 describes an electronic vapor provision system including a pressure drop or air flow sensor for monitoring inhalation by a user through the electronic vapor provision system; and a control unit for detecting the start and end of inhalation based on readings from the sensor.

U.S. Pat. No. 11,096,419 describes a sensor configured to produce measurements of atmospheric air pressure, and a processing circuitry coupled to the sensor and the switch. The processing circuitry determines a difference between the measurements of atmospheric air pressure from the sensor and a reference atmospheric air pressure. Only when the difference is at least a threshold difference, the processing circuitry outputs a signal to cause the switch to switchably connect and disconnect an output voltage from the power source to the aerosol production component to power the aerosol production component for an aerosol-production time period. And the sensor is an absolute pressure sensor. U.S. Pat. No. 11,241,044 provides a cartridge that includes an airflow control feature for controlling airflow in the cartridge. The airflow control is realized with a pressure sensor that it experiences pressure changes concurrently with air passing through the vaporizer device from the air inlet to the air outlet.

Capacitive sensing components can also be used to allow for diverse types of "power-up" and/or "power-down" for one or more components of the device. Capacitive sensing can include the use of any sensor incorporating technology based on capacitive coupling including, but not limited to, sensors that detect and/or measure proximity, position or displacement, humidity, fluid level, pressure, temperature, or acceleration. Capacitive sensing can arise from electronic components providing for surface capacitance, projected capacitance, mutual capacitance, or self-capacitance. Capacitive sensors generally can detect anything that is conductive or has a dielectric constant different than that of the air.

In light of the foregoing, it can be seen that a variety of mechanisms can be employed to facilitate actuation/deactuation of current to one or more heating elements and to other components of the smoking device. Specifically, the article can comprise a component that regulates a previously initiated current flow from the electrical power source to the heating element.

As people skilled in the art understand, a pressure sensor is a linear device or a quasi-linear device when measuring the airflow pressure. As such, the voltage output from the pressure sensor is in strict linear proportion to or largely linearly proportional to the air pressure measured. A switch, however, is a non-linear device that acts much like a pulse. Therefore, unless the pressure sensor is calibrated with each individual aerosol delivery device in which it is installed, the actuation and/or deactuation pressure of the device is largely dependent upon the manufacturing tolerance of the device itself. The consistency of actuation pressure is thus a big problem. The above is also true for the capacitive sensing components when used to switch on and off the electric current supplied to the heating element of an aerosol vaporizer.

Advantageously, the present invention provides a solution to the aforementioned problems.

SUMMARY OF THE INVENTION

One aspect of the present invention provides a micromachined capacitive flow sensor. The sensor includes a movable membrane having one or more venting holes; and a perforated backplate having perforation holes or through holes. The perforated backplate is spaced from, and in parallel with the movable membrane. A gas gap (such as an air gap) is formed between the movable membrane and the perforated backplate. The movable membrane, the gas gap and the perforated backplate form a variable capacitor whose capacitance varies with movement of the membrane relative to the perforated backplate.

Another aspect of the invention provides a packaged flow sensor product comprising the micromachined capacitive flow sensor as described above. In typical embodiments, the packaged flow sensor product may further include a gas inlet and a gas outlet. A gas flows into the sensor through the gas inlet and exits the sensor through the gas outlet.

Still another aspect of the invention provides a method of using or operating the packaged flow sensor product as described above. The method includes the following steps: (i) receiving a gas flow from outside of the packaged flow sensor product through the inlet; (ii) causing the gas to flow from the inlet to the venting holes on the movable membrane, wherein the gas flow pressures the movable membrane causing it to deflect towards the perforated backplate; (iii) passing the gas through the gas gap and the perforation holes or the through holes on the perforated backplate; and (iv) releasing the gas from the packaged flow sensor product through the outlet.

In a variety of exemplary embodiments, the present invention relates generally to a micromachined capacitive flow sensor having a movable membrane with a plurality of holes that is fully anchored and supported. A perforated backplate having perforation holes is spaced in parallel from the movable membrane. An air gap is formed by the movable membrane and the perforated backplate. A variable capacitor is thus formed with the movable membrane, the air gap and the backplate. The capacitance of the variable capacitor varies with the movement of the movable membrane relative to the backplate under the air flow pressure. This invention also relates to the method of operating the micromachined capacitive flow sensor. The air flow pressures the movable membrane causing it to deflect towards the backplate. The movable membrane snaps down to the backplate and rests on the dimples as the pressure of the air flow is over a set threshold. The capacitance of the variable capacitor jumps non-linearly as the movable membrane pulls in. And the capacitance of the variable capacitor at which point the movable membrane snaps down to the backplate is the switching point of the capacitive flow sensor.

In a variety of exemplary embodiments, an object of the present invention is to provide a micromachined capacitive flow sensor that has a movable diaphragm and a fixed perforated plate to form a variable capacitor. A further object of the present invention is to provide a micromachined capacitive flow sensor that its movable diaphragm deflects in response to the puff and/or smoking action by the user in an aerosol delivery device. The capacitance of such variable capacitor increases as the user puffs or smokes. Another object of the present invention is to provide a micromachined capacitive flow sensor that functions as a switch to turn on and off the electric power to the heating elements of an aerosol delivery device. A further object of the present invention is to provide a micromachined capacitive flow sensor with its movable diaphragm being in the pulled-in status when the puffing and/or smoking pressure is above the set threshold, it turns on the electric power to the heating elements of an aerosol delivery device. Another object of the present invention is to provide a micromachined capacitive flow sensor of which its movable diaphragm bounces back to the normal status when user stops puffing or smoking in an aerosol delivery device. The foregoing and other objects of the invention are achieved by a micromachined capacitive flow sensor including a movable diaphragm separated by a distance from a fixed perforated plate. The movable diaphragm deflects in response to people puffing and/or drawing the air in an aerosol delivery device. The movable diaphragm collapses and enters the "pulled-in" status when the puffing and/or smoking pressure is over the set threshold, and the flow sensor thus turns on the electric power to the heating elements of an aerosol delivery device. When the puff and/or smoking stops, the movable diaphragm bounces back to the normal status and switches off the power supply to the hearing elements of an aerosol delivery device.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
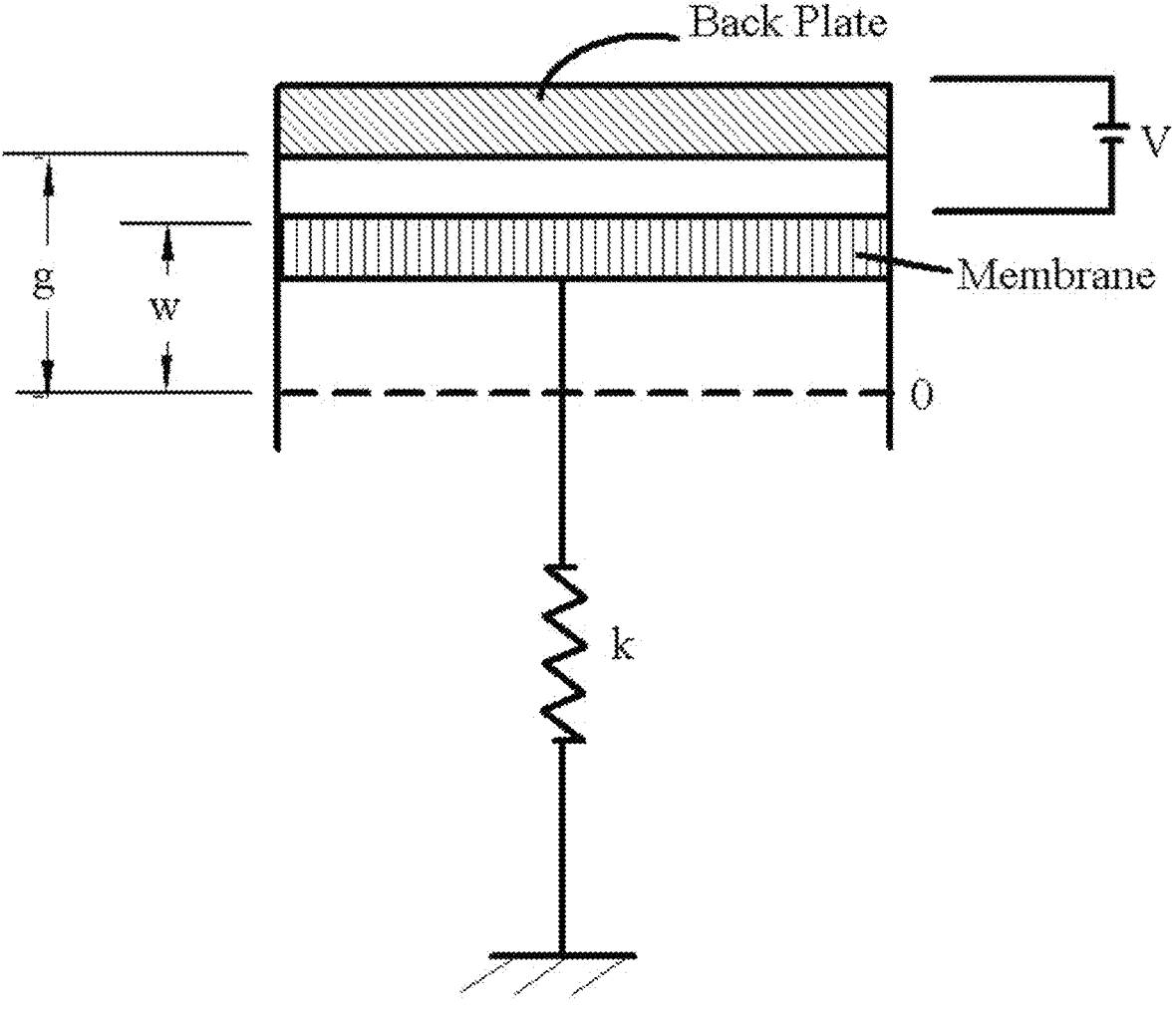
FIG. 1 illustrates an electrostatic microactuator having a movable diaphragm against a fixed plate.

The classical model used to simulate the working of an electrostatic microactuator having a movable diaphragm against a fixed plate is to consider a rigid membrane attached by a spring and subjected to an electrostatic field, as shown in FIG. 1. The mechanical law governing the electrostatic actuator can be expressed as follow:

$$m\frac{d^2w}{dt^2} + \lambda\frac{dw}{dt} + kw = \frac{\varepsilon V^2}{2(g-w)^2}S \tag{1}$$

where w is the deflection of membrane, m the mass, $\lambda$ the damping factor, and k the spring constant. k depends on the geometry of the microstructure. The excitation is represented with the electrostatic pressure through a gap g applied on the membrane surface S, with V the bias voltage and $\varepsilon$ the permittivity. The mass can be expressed with the geometrical characteristics of the plate: $m=\rho hS$, with $\rho$ the volume density and h the membrane thickness. Equation (1) clearly shows the non-linearity of the electrostatic microactuator. The excitation depends on the plate deflection. There is no analytic solution of this equation. We can express the solution of the deflection in a static mode. In this case, all derivations are null. We obtain the classical voltage limitation ($V_s$) due to the instability of the electrostatic excitation; this instability provokes the sticking of the membrane on the back plate. The equilibrium is stable when $$V < \sqrt{\frac{8kg^3}{27\varepsilon S}}.$$

But the equilibrium is unstable, and the membrane will be stuck on to the back plate, when $$V > \sqrt{\frac{8kg^3}{27\varepsilon S}}.$$

Figure 2:
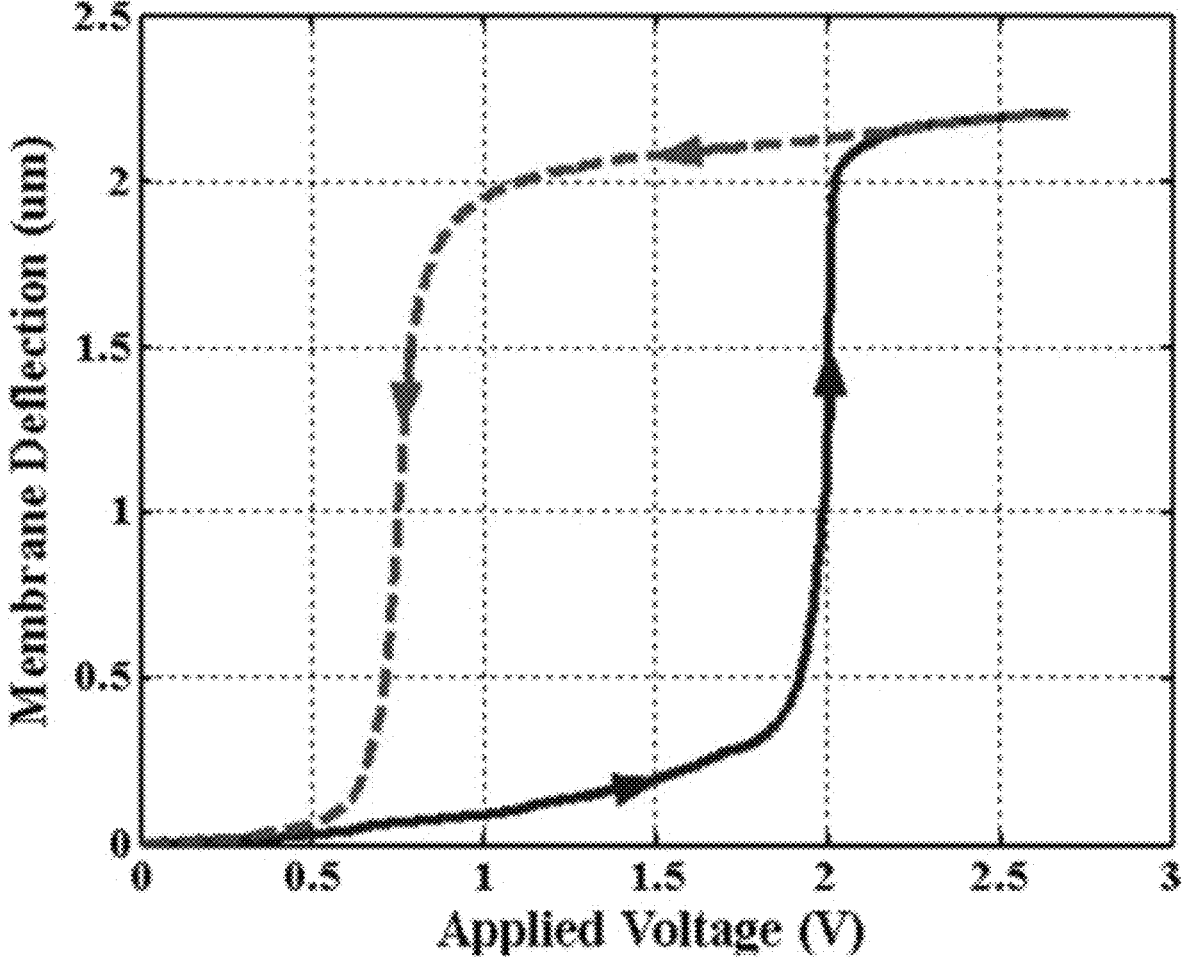
FIG. 2 illustrates the hysteresis curve due to the pull-in effect in membrane.

FIG. 2 illustrates the hysteresis effect due to the non-linearity of the electrostatic microactuator under applied bias voltage V. Consider now that a pressure force, such as the puff and/or smoking by the user in an aerosol delivery device, is also acting on the membrane such that it is pulling the membrane towards the back plate. Equation (1) now becomes:

$$m\frac{d^2w}{dt^2} + \lambda\frac{dw}{dt} + kw = \frac{\varepsilon V^2}{2(g-w)^2}S + pS. \qquad (2)$$

In Equation (2), p is the pressure difference across the membrane. In this case, p is not a function of the membrane deflection w. The snap down (sometimes also refers to as pull-in) voltage is then calculated as:

$$V_s = \sqrt{\frac{8(kg - pS)^2}{27\varepsilon Sk^2}}. \qquad (3)$$

From equation (3), the presence of the pressure force on the membrane has essentially decreased the snap down voltage. And the pull-in distance is given by:

$$w = \frac{kg + 2pS}{3k}. \qquad (4)$$

This means that with the pressure force acting on the membrane, the pull-in distance is larger than that at the normal condition when only electrostatic force is applied.

Equation (3) illustrates that when there is no external electrostatic force is applied to the membrane, the pressure force alone will also cause the membrane to pull in and exhibit the same non-linearity as it would under the electrostatic force. In this case, equation (3) gives kg=pS, and from equation (4), the pull-in distance thus becomes:

$$w = \frac{pS}{k}. \qquad (5)$$

Figure 3:
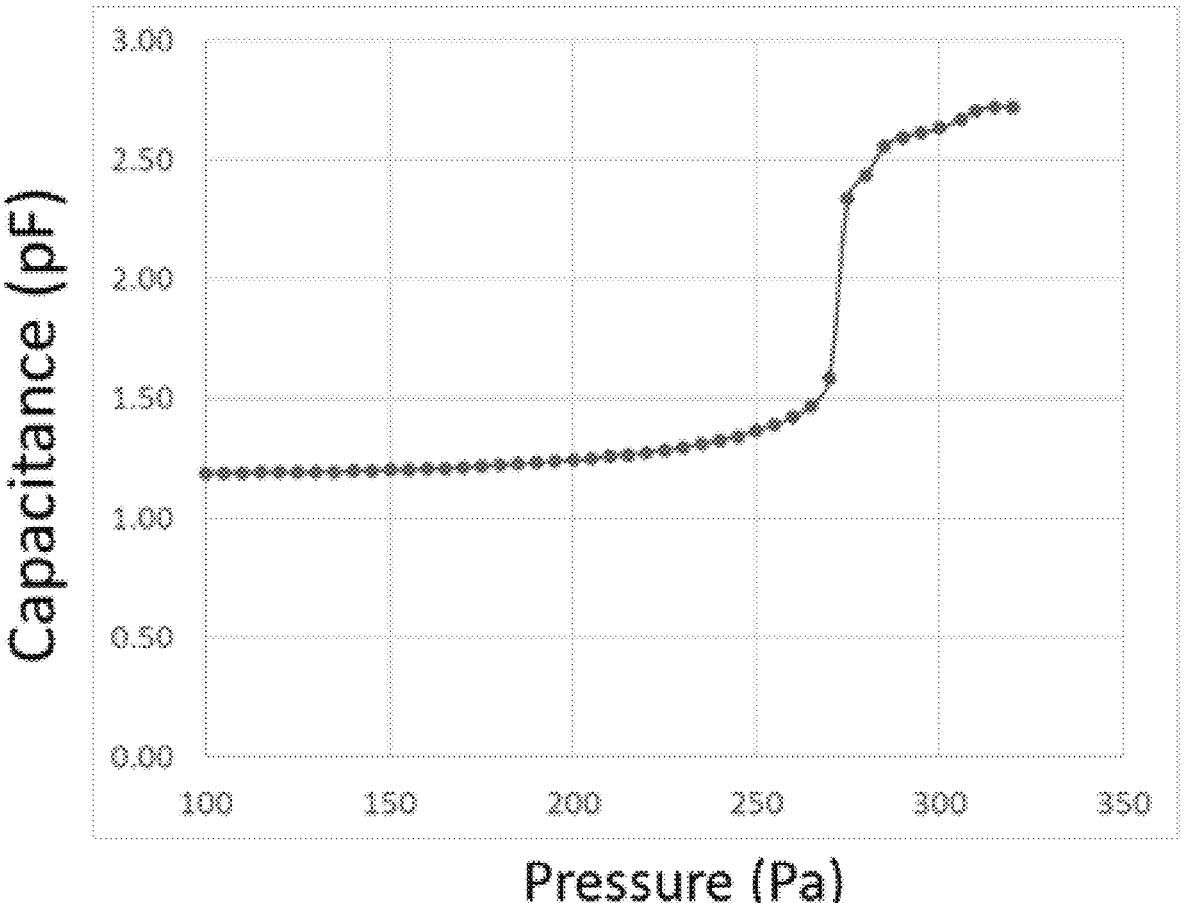
FIG. 3 demonstrates the capacitance measured from a sample micromachined capacitive flow sensor under the air flow pressure.

FIG. 3 illustrates the capacitance measured from a sample micromachined capacitive flow sensor manufactured according to one preferred embodiment of the present invention, under the air flow pressure. The flow sensor has a movable diaphragm against a fixed plate. When a pressure force exerted by an air flow is applied on the movable diaphragm, the diaphragm deflects and thus the capacitance increases. As can be seen in FIG. 3, when the applied pressure force is between 260 Pa to 275 Pa, the movable diaphragm snaps down towards the backplate, thus causing the capacitance to jump from about 1.4 pF to over 2.6 pF, an increase of more than 80%. This exhibits the "switching behavior", or the non-linearity, that is required for airflow switch in an aerosol delivery device.

Figure 4:
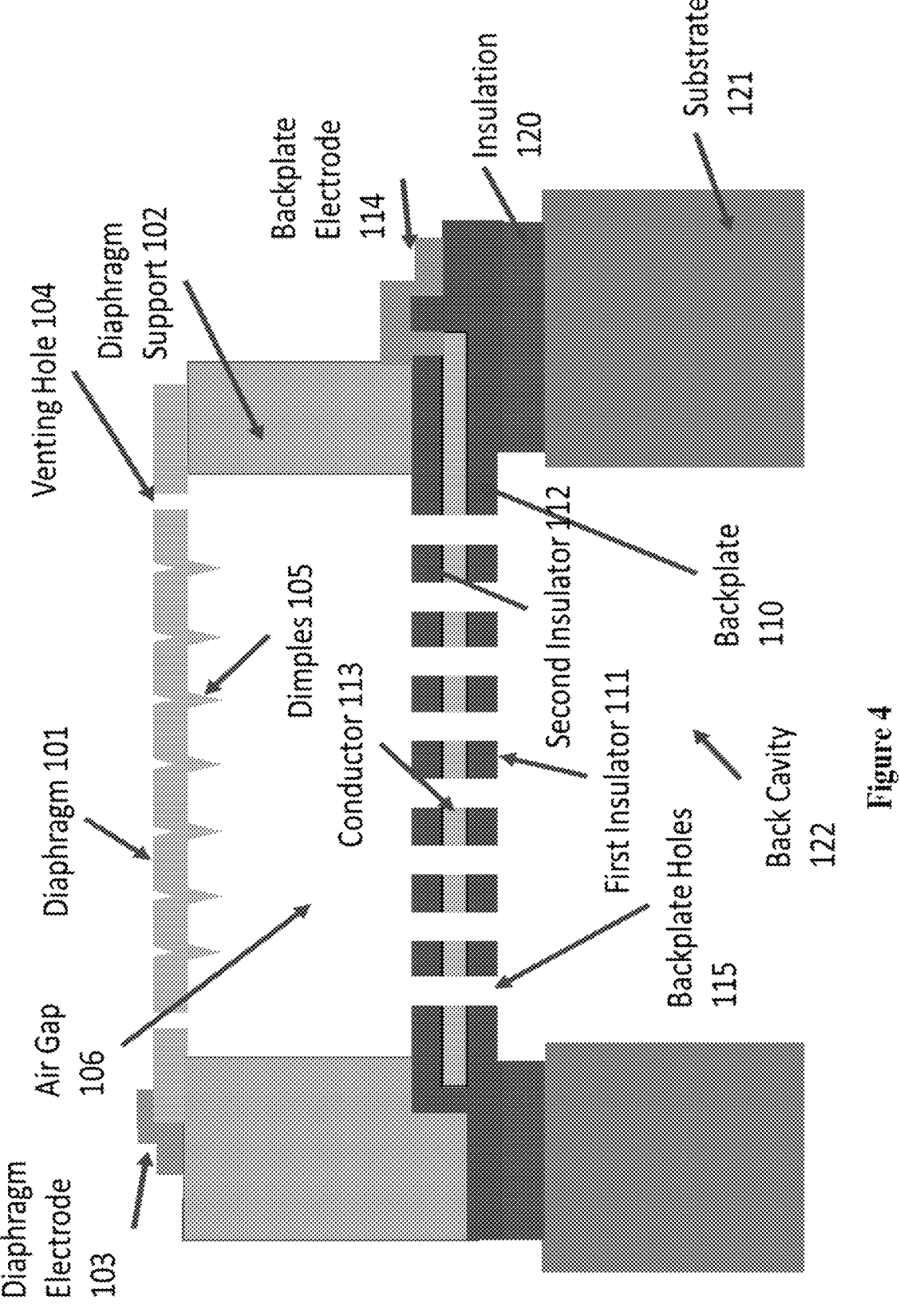
FIG. 4 is a cross-sectional view of a micromachined capacitive flow sensor having diaphragm supported above the backplate in accordance with an exemplary embodiment of the present invention.

FIG. 4 shows a micromachined capacitive flow sensor in some embodiments of the invention. The sensor includes a movable membrane 101 (or diaphragm 101) having a plurality of holes 104 such as venting holes 104; and a perforated backplate 110 (such as backplate 110) having perforation holes 115 (or through holes 115 or backplate holes 115). The perforated backplate 110 is spaced from, and in parallel with the movable membrane 101. A gas gap 106

(such as an air gap 106) is formed between the movable membrane 101 and the perforated backplate 110. The movable membrane 101, the gas gap 106 and the perforated backplate 110 form a variable capacitor whose capacitance varies with movement of the membrane 101 relative to the perforated backplate 110. Such a variable capacitor is anchored to, and supported on, a substrate 121, and the substrate 121 has a cavity 122 (or back cavity 122) formed below the variable capacitor to allow gas such as air to flow through. The movable membrane 101 and/or the perforated backplate 110 may have anti-stiction dimples 105 extending into the gas gap 106. In preferred embodiments, the gas (such as air) gap 106 formed by the movable membrane 101 and the perforated backplate 110 is larger than a pull-in depth of the movable membrane 101 under electrostatic excitation.

In some specific embodiments, the diaphragm 101 is fully anchored and supported by a diaphragm support 102. The diaphragm 101 is typically made of conductive material such as doped polysilicon, while diaphragm support 102 is made of insulating and/or dielectric materials. There are venting holes 104 on the diaphragm 101. The diaphragm 101 also has dimples 105. The dimples 105 are typically 0.2 um to 1.0 um in height, and 1.0 um to 5.0 um in diameter. The diameter of venting hole 104, however, is on the order of a few micrometers, but typically not more than 20 um. A metal layer is coated at one end of the diaphragm 101 to make electrical contact and to form diaphragm electrode 103. The diaphragm support 102 is supported at its edges on backplate 110. The backplate 110 may typically have a sandwich structure in which the first insulator 111 and the second insulator 112 encapsulate the conductor 113. The backplate 110 is perforated and has backplate holes 115 to allow the passage of air flow. The size of backplate holes 115 is usually 2 um to 10 um in diameter.

The backplate 110 sits on the insulation 120 or insulation layer 120, which in turn is coated on substrate 121. A back cavity 122 is formed in substrate 121 and is right under the backplate 110 in the example of FIG. 4. The conductor 113 is exposed at one end and a metal layer is coated at this end to make electrical contact and to form backplate electrode 114. The diaphragm 101 is spaced a certain distance, usually on the order of a few micrometers but typically not more than 20 micrometers, away from the backplate 110. The diaphragm 101 and the backplate 110 thus form a parallel capacitor spaced by an air gap 106. When the external pressure exerted by the sound and/or air flow on diaphragm 101, it typically deflects in response to the pressure. If the pressure is large such that it cannot be dissipated or equalized by the venting holes 104, the diaphragm 101 will be pressed towards the backplate 110.

Figure 5:
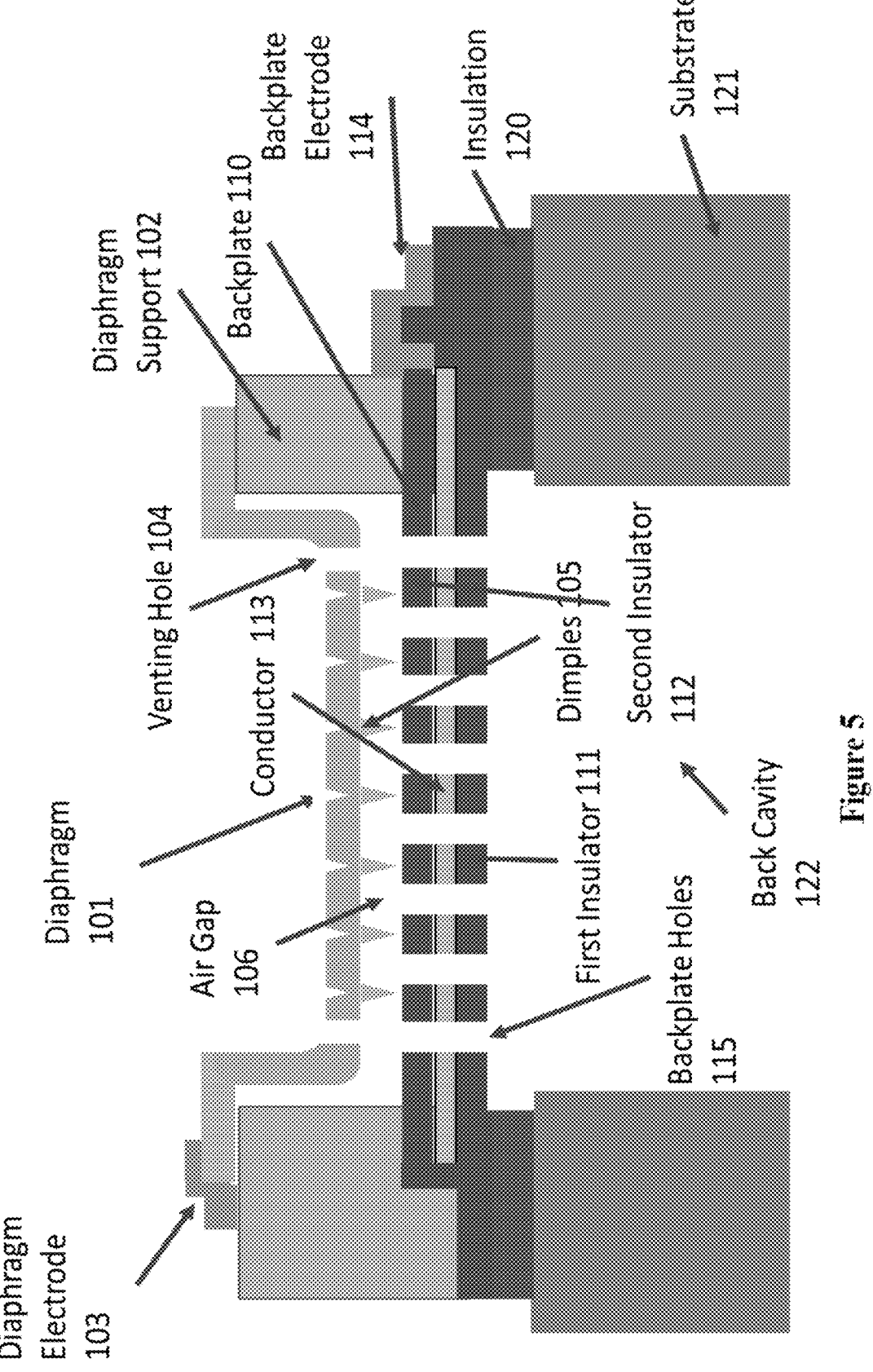
FIG. 5 is a cross-sectional view of a micromachined capacitive flow sensor having diaphragm supported above the backplate, in which the diaphragm is pulled in against the backplate.

There is an air flow passing through venting holes 104, air gap 106, backplate holes 115 and the back cavity 122 in succession. If the air flow is larger than that can be dissipated through venting holes 104, the diaphragm 101 will deflect downward and move closer to the backplate 110. This will reduce the air gap 106, and the capacitance of the capacitor so formed by the diaphragm 101 and backplate 110 will increase. As the air flow becomes faster, the pressure exerted onto the diaphragm 101 will also increase. Initially, this relationship is linear or quasilinear. In other words, the deflection of diaphragm 101 is in linear or quasilinear proportion to the pressure exerted onto diaphragm 101 by the air flow. When the air flow further increases and pressure exerted onto diaphragm 101 is more than the pull-in threshold of a membrane as discussed previously, the diaphragm 101 will be pulled in and rest on the backplate 110 as shown in FIG. 5. In this case, the diaphragm 101 is separated from the backplate 110 only by the height of dimples 105, and so is the height of air gap 106. It needs to be noted that in order to allow the occurrence of pull-in of diaphragm 101, the air gap 106 has to be made large enough, preferably about 1.2 to 2 times of pull-in depth under the electrostatic excitation. In other words, the classical voltage limitation $(V_s)$ due to the instability of the electrostatic excitation shall be in a reasonable range.

Referring back to FIG. 3, the capacitance of the capacitor formed by the diaphragm 101 and backplate 110 in an embodiment increases linearly with the pressure exerted onto the diaphragm 101 by the air flow for pressures below 220 Pa. Then, the capacitance increases quasilinear with the pressure in ranges from 220 Pa to about 260 Pa. The capacitance has a jump of 80% increase for pressure from 260 Pa to about 275 Pa. This jump in capacitance is much like the rising edge of a pulse, as those skilled in the art are familiar with. This pulse-like behavior of capacitance jump, or the non-linearity, is ideal for making an air flow switch in an aerosol delivery device since it can precisely control the rate of air flow in the aerosol delivery channel.

As shown in FIG. 5, when the diaphragm 101 is pulled in against the backplate 110 under the pressure exerted by the air flow, it is separated from the backplate 110 only by the dimples 105 which contacts the second insulator 112 of the backplate 110. The dimples 105 are typically made cone-shaped so that they are sharp at the end to prevent the diaphragm 101 sticking to the backplate 110. To further increase the capacitance of the capacitor so formed by the diaphragm 101 and backplate 110, the second insulator 112 of the backplate 110 is usually made of materials having high dielectric constant, such as silicon nitride. When the diaphragm 101 snaps down to the backplate 110 and rests on the dimples 105 as the pressure of the air flow is over a set threshold. The capacitance of the variable capacitor so formed by the diaphragm 101, the air gap 106 and the backplate 110 jumps non-linearly as the diaphragm 101 pulls in. The capacitance of the variable capacitor at which point the diaphragm 101 snaps down to the backplate 110 is defined as the switching point of the packaged capacitive flow sensor product manufactured according to one preferred embodiment of the present invention.

Figure 6:
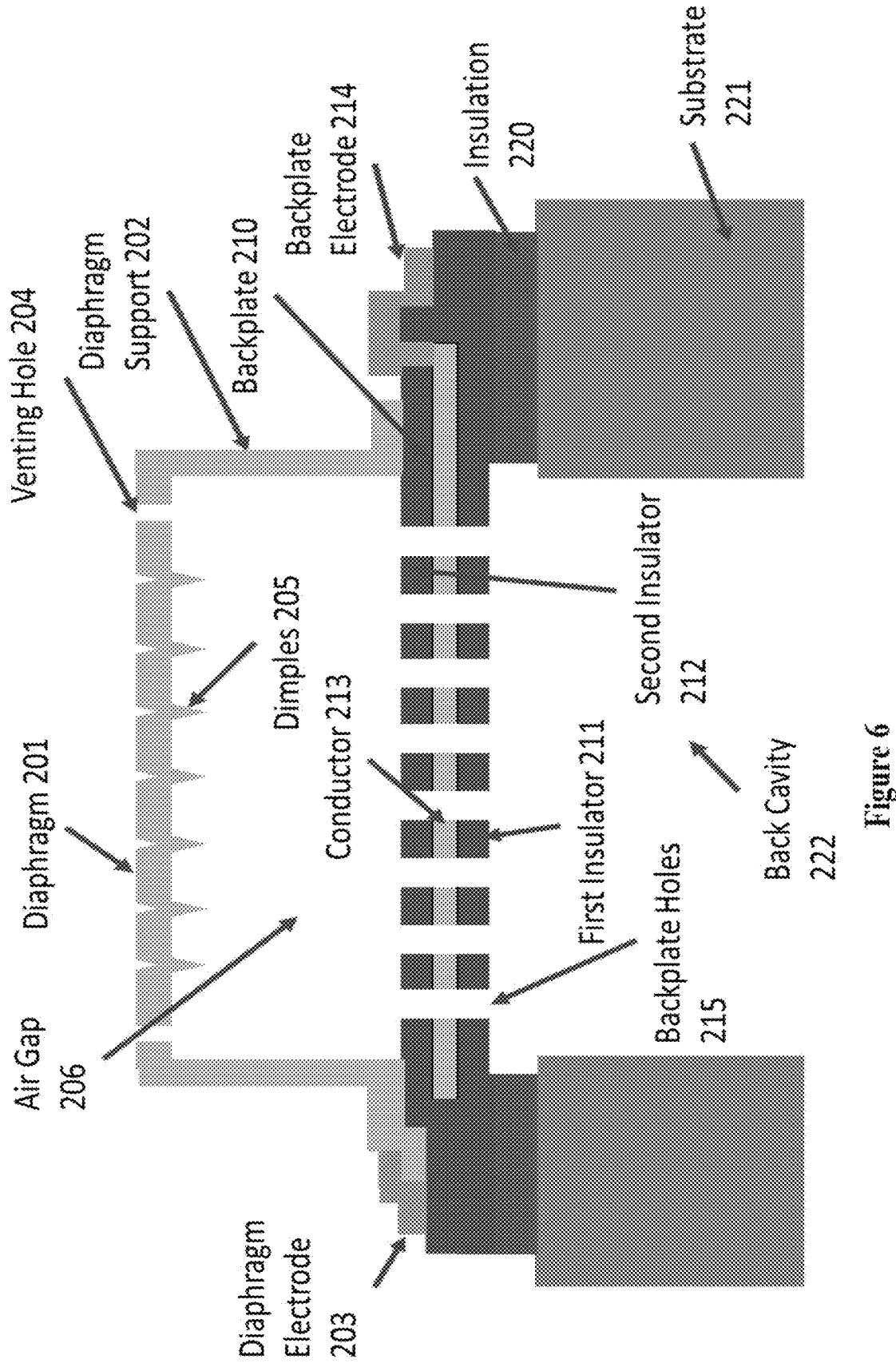
FIG. 6 shows a cross-sectional view of a micromachined capacitive flow sensor having diaphragm directly anchored on the backplate in accordance with an exemplary embodiment of the present invention.

FIG. 6 illustrates a micromachined capacitive flow sensor fabricated according to another preferred embodiment of the present invention. The flow sensor includes a diaphragm 201 fully anchored and supported by a diaphragm support 202. The diaphragm 201 is typically made of conductive material such as doped polysilicon, while diaphragm support 202 is made of the same conducting material, such as polysilicon. This is different from diaphragm support 102 in FIG. 4 that is made of insulating and/or dielectric materials. There are venting holes 204 on the diaphragm 201, and it also has dimples 205. The dimples 205 are typically 0.2 um to 1.0 um in height, and 1.0 um to 5.0 um in diameter. The diameter of venting hole 204, however, is on the order of a few microm-eters, but not more than 20 um. A metal layer is coated at one end of the diaphragm 201 to make electrical contact and to form diaphragm electrode 203. The diaphragm support 202 is anchored at its edges on backplate 210. The backplate 210 is typically a sandwich structure in which the first insulator 211 and the second insulator 212 encapsulate the conductor 213. The backplate 210 is perforated and has backplate holes 215 to allow the passage of air flow. The size of backplate holes 215 is usually 2 um to 10 um in diameter.

The backplate 210 sits on the insulation 220, which in turn is coated on substrate 221. A back cavity 222 is formed in substrate 221 and is right under the backplate 210. The conductor 213 is exposed at one end and a metal layer is coated at this end to make electrical contact and to form backplate electrode 214. The diaphragm 201 is spaced a certain distance, usually on the order of a few micrometers but not more than 20 micrometers, away from the backplate 210. The diaphragm 201 and the backplate 210 thus form a parallel capacitor spaced by an air gap 206. When the external pressure exerted by the sound and/or air flow on diaphragm 201, it typically deflects in response to the pressure. If the pressure is large such that it cannot be dissipated or equalized by the venting holes 204, the dia-phragm 201 will be pressed towards the backplate 210.

Figure 7:
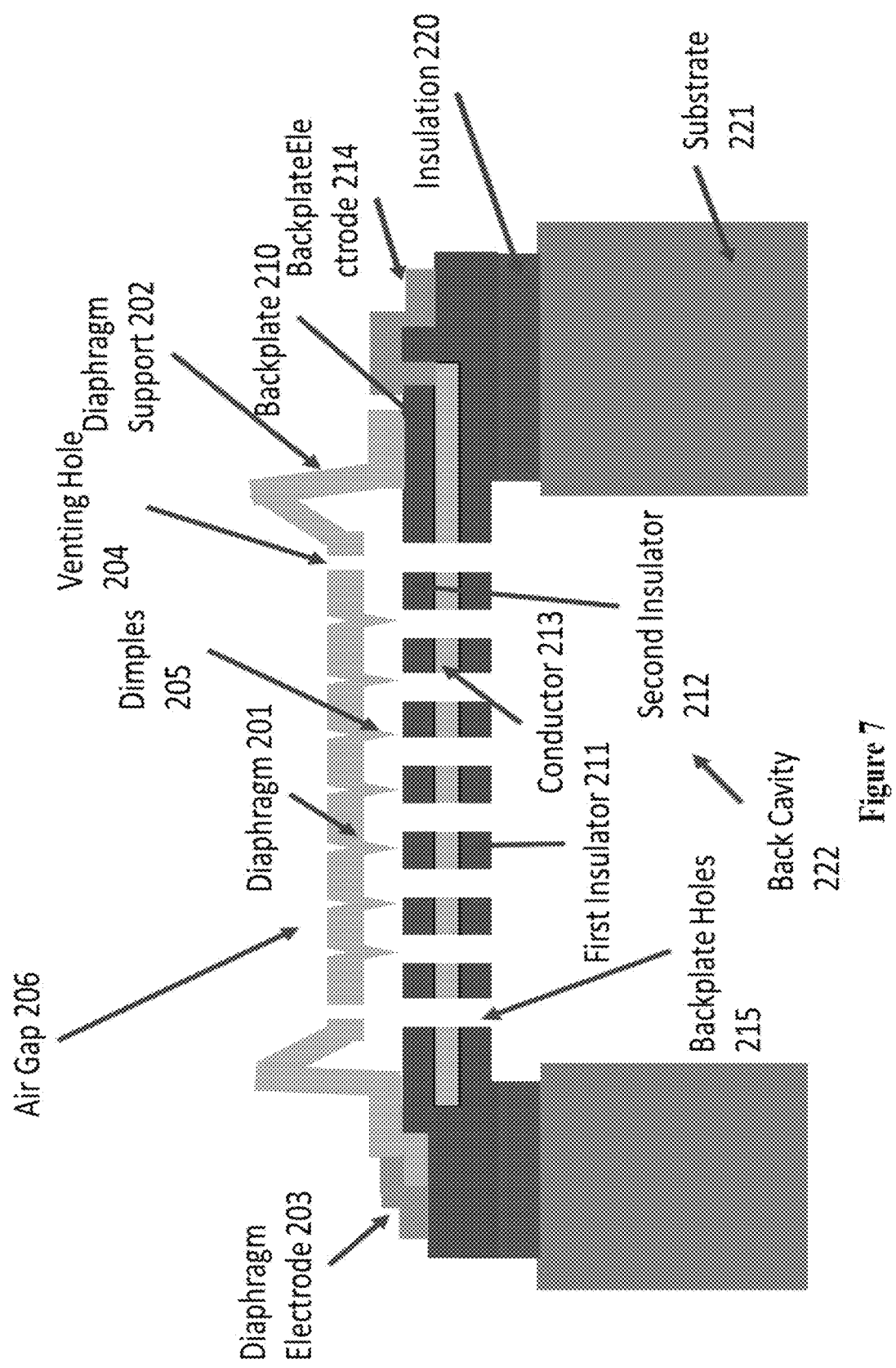
FIG. 7 shows a cross-sectional view of a micromachined capacitive flow sensor having diaphragm anchored on the backplate, in which the diaphragm is pulled in against the backplate

Assuming now there is an air flow passing through venting holes 204, air gap 206, backplate holes 215 and the back cavity 222 in succession. If the air flow is larger than that can be dissipated through venting holes 204, the dia-phragm 201 will deflect downward and move closer to the backplate 210. This will reduce the air gap 206, and the capacitance of the capacitor so formed by the diaphragm 201 and backplate 210 will increase. As the air flow becomes faster and thus the pressure exerted onto the diaphragm 201 will also increase. Initially, this relationship is linear or quasilinear. In other words, the deflection of diaphragm 201 is in linear or quasilinear proportion to the pressure exerted onto diaphragm 201 by the air flow. When the air flow further increases and pressure exerted onto diaphragm 201 is more than the pull-in threshold of a membrane as discussed previously, the diaphragm 201 will be pulled in and rest on the backplate 210, as shown in FIG. 7. In this case, the diaphragm 201 is separated from the backplate 210 only by the height of dimples 105, which is therefore the height of air gap 206. It should be noted that in order to allow the occurrence of pull-in of diaphragm 201, the air gap 206 has to be made large enough, preferably about 1.2 to 2 times of pull-in depth under the electrostatic excitation. In other words, the classical voltage limitation $(V_s)$ due to the instability of the electrostatic excitation shall be in a rea-sonable range.

As shown in FIG. 7, when the diaphragm 201 is pulled in against the backplate 210 under the pressure exerted by the air flow, it is separated from the backplate 210 only by the dimples 205 which contacts the second insulator 212 of the backplate 210. The dimples 205 are typically made cone-shaped so that they are sharp at the end to prevent the diaphragm 201 sticking to the backplate 210. To further increase the capacitance of the capacitor so formed by the diaphragm 201 and backplate 210, the second insulator 212 of the backplate 210 (which contacts dimples 205 under a high pressure exerted by the air flow) is usually made of materials having high dielectric constant, such as silicon nitride. When the diaphragm 201 snaps down to the back-plate 210 and rests on the dimples 205 as the pressure of the air flow is over a set threshold. The capacitance of the variable capacitor so formed by the diaphragm 201, the air gap 206 and the backplate 210 jumps non-linearly as the diaphragm 201 pulls in. The capacitance of the variable capacitor at which point the diaphragm 201 snaps down to the backplate 210 is said to be the switching point of the packaged capacitive flow sensor product manufactured according to other preferred embodiments of the present invention.

Figure 8:
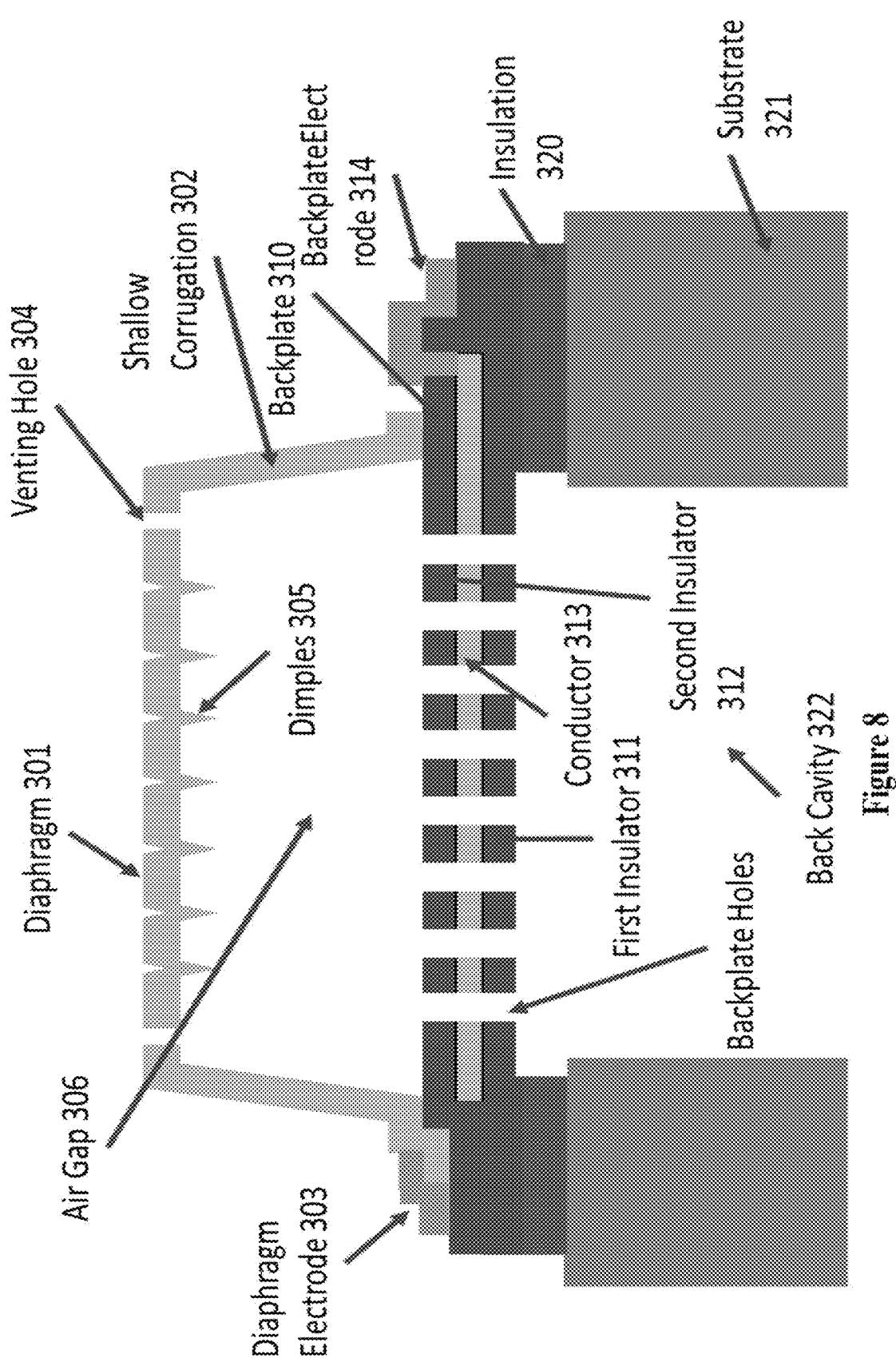
FIG. 8 shows the cross-sectional view of a micromachined capacitive flow sensor having a diaphragm with shallow corrugation and anchored on the backplate in accordance with an exemplary embodiment of the present invention.

FIG. 8 shows a micromachined capacitive flow sensor fabricated according to another preferred embodiment of the present invention. The flow sensor includes a diaphragm 301 having a shallow corrugation 302 at the edge is fully anchored and supported on backplate 310. The diaphragm 301 along with the shallow corrugation 302 is typically made of conductive material such as doped polysilicon. The shallow corrugation 302 may function similarly to the diaphragm support 202 in FIG. 6. However, the shallow corrugation 302 is tilted and is not perpendicular to the backplate, while the diaphragm support 202 is upright and is perpendicular to the backplate. There are venting holes 304 on the diaphragm 301, and it also has dimples 305. The dimples 305 are typically 0.2 um to 1.0 um in height, and 1.0 um to 5.0 um in diameter. The diameter of venting hole 304, however, is on the order of a few micrometers, but not more than 20 um. A metal layer is coated at one end of the diaphragm 301 to make electrical contact and to form diaphragm electrode 303. The shallow corrugation 302 is anchored on backplate 310. The backplate 310 is typically a sandwich structure in which the first insulator 311 and the second insulator 312 encapsulate the conductor 313. The backplate 310 is perforated and has backplate holes 315 to allow the passage of air flow. The size of backplate holes 315 is usually 2 um to 10 um in diameter.

The backplate 310 sits on the insulation 320, which in turn is coated on substrate 321. A back cavity 322 is formed in substrate 321 and is right under the backplate 310. The conductor 313 is exposed at one end and a metal layer is coated at this end to make electrical contact and to form backplate electrode 314. The diaphragm 301 is spaced a certain distance, usually on the order of a few micrometers but not more than 20 micrometers, away from the backplate 310. The diaphragm 301 and the backplate 310 thus form a parallel capacitor spaced by an air gap 306. When the external pressure exerted by the sound and/or air flow on diaphragm 301, it typically deflects in response to the pressure. If the pressure is large such that it cannot be dissipated or equalized by the venting holes 304, the diaphragm 301 will be pressed towards the backplate 310. Along with the bending of diaphragm 301, the shallow corrugation 302 will also yield in (or bend toward the air gap 306) to allow the intersection at diaphragm 301 and the shallow corrugation 302 deform much less than that at diaphragm 101 and diaphragm support 102, and also much less than that at diaphragm 201 and diaphragm support 202.

Figure 9:
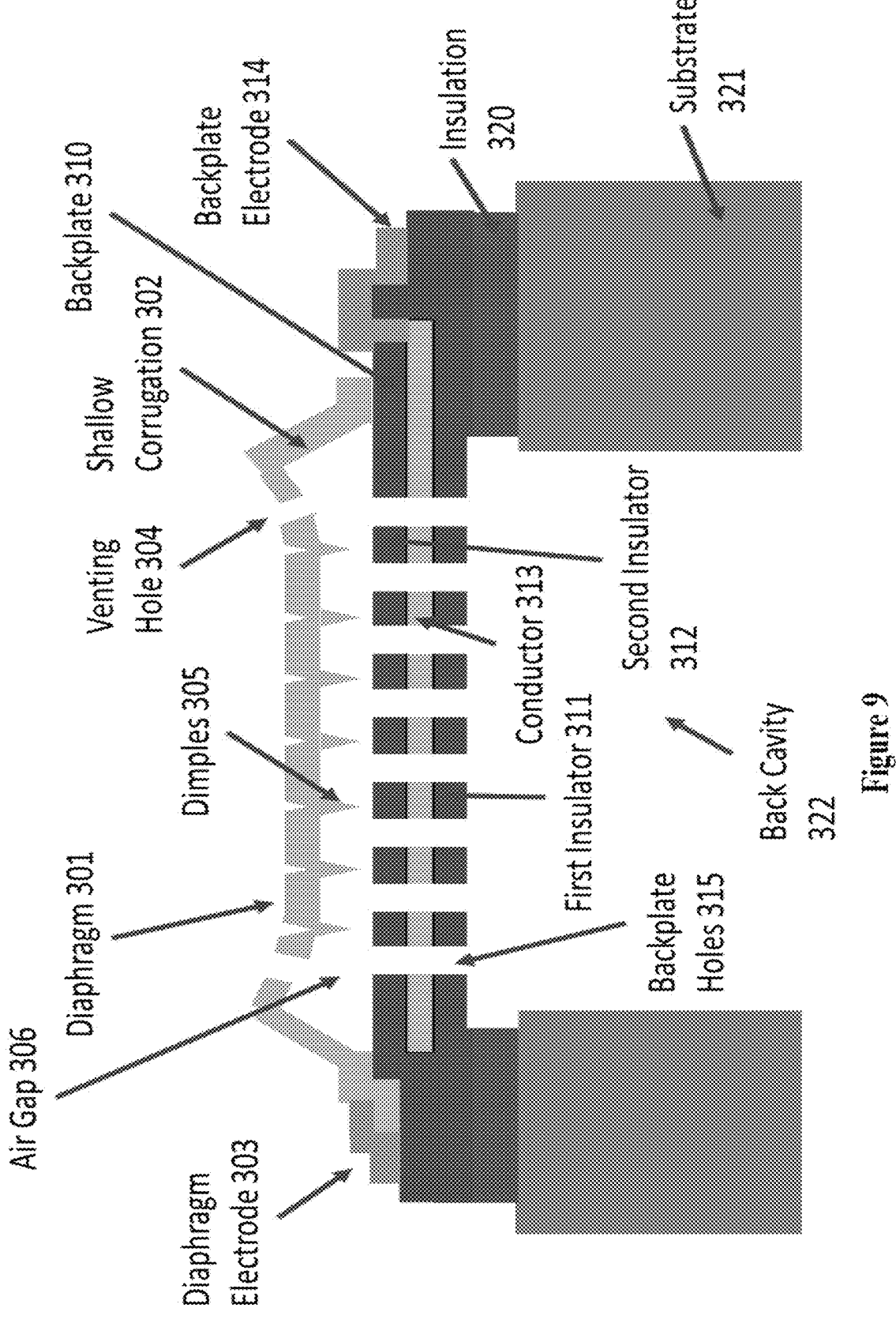
FIG. 9 shows the cross-sectional view of a micromachined capacitive flow sensor having a diaphragm with shallow corrugation and anchored on the backplate, in which the diaphragm is pulled in against the backplate.

Assuming now there is an air flow passing through venting holes 304, air gap 306, backplate holes 315 and the back cavity 322 in succession. If the air flow is larger than that can be dissipated through venting holes 304, the diaphragm 301 will deflect downward and move closer to the backplate 310. This will reduce the air gap 306, and the capacitance of the capacitor so formed by the diaphragm 301 and backplate 310 will increase. As the air flow becomes faster and thus the pressure exerted onto the diaphragm 301 will also increase. Initially, this relationship is linear or quasilinear. In other words, the deflection of diaphragm 301 is in linear or quasilinear proportion to the pressure exerted onto diaphragm 301 by the air flow. When the air flow further increases and pressure exerted onto diaphragm 301 is more than the pull-in threshold of a membrane as discussed previously, the diaphragm 301 will be pulled in and rest on the backplate 310, as shown in FIG. 9. In this case, the diaphragm 301 is separated from the backplate 310 only by the height of dimples 305, and so is the height of air gap 306. It needs to be noted that in order to allow the occurrence of pull-in of diaphragm 301, the air gap 306 has to be made large enough, preferably about 1.2 to 2 times of pull-in depth under the electrostatic excitation. In other words, the classical voltage limitation (Vs) due to the instability of the electrostatic excitation shall be in a reasonable range.

As illustrated in FIG. 9, when the diaphragm 301 is pulled in against the backplate 310 under the pressure exerted by the air flow, it is separated from the backplate 310 only by the dimples 305. The dimples 305 are typically made cone-shaped so that they are sharp at the end to prevent the diaphragm 301 sticking to the backplate 310. To further increase the capacitance of the capacitor so formed by the diaphragm 301 and backplate 310, the second insulator 312 of the backplate 310 is usually made of materials having high dielectric constant, such as silicon nitride. When the diaphragm 301 snaps down to the backplate 310 and rests on the dimples 305 as the pressure of the air flow is over a set threshold. The capacitance of the variable capacitor so formed by the diaphragm 301, the air gap 306 and the backplate 310 jumps non-linearly as the diaphragm 301 pulls in. The capacitance of the variable capacitor at which point the diaphragm 301 snaps down to the backplate 310 is used as the switching point of the packaged capacitive flow sensor product manufactured according to a further preferred embodiment of the present invention.

Figure 10:
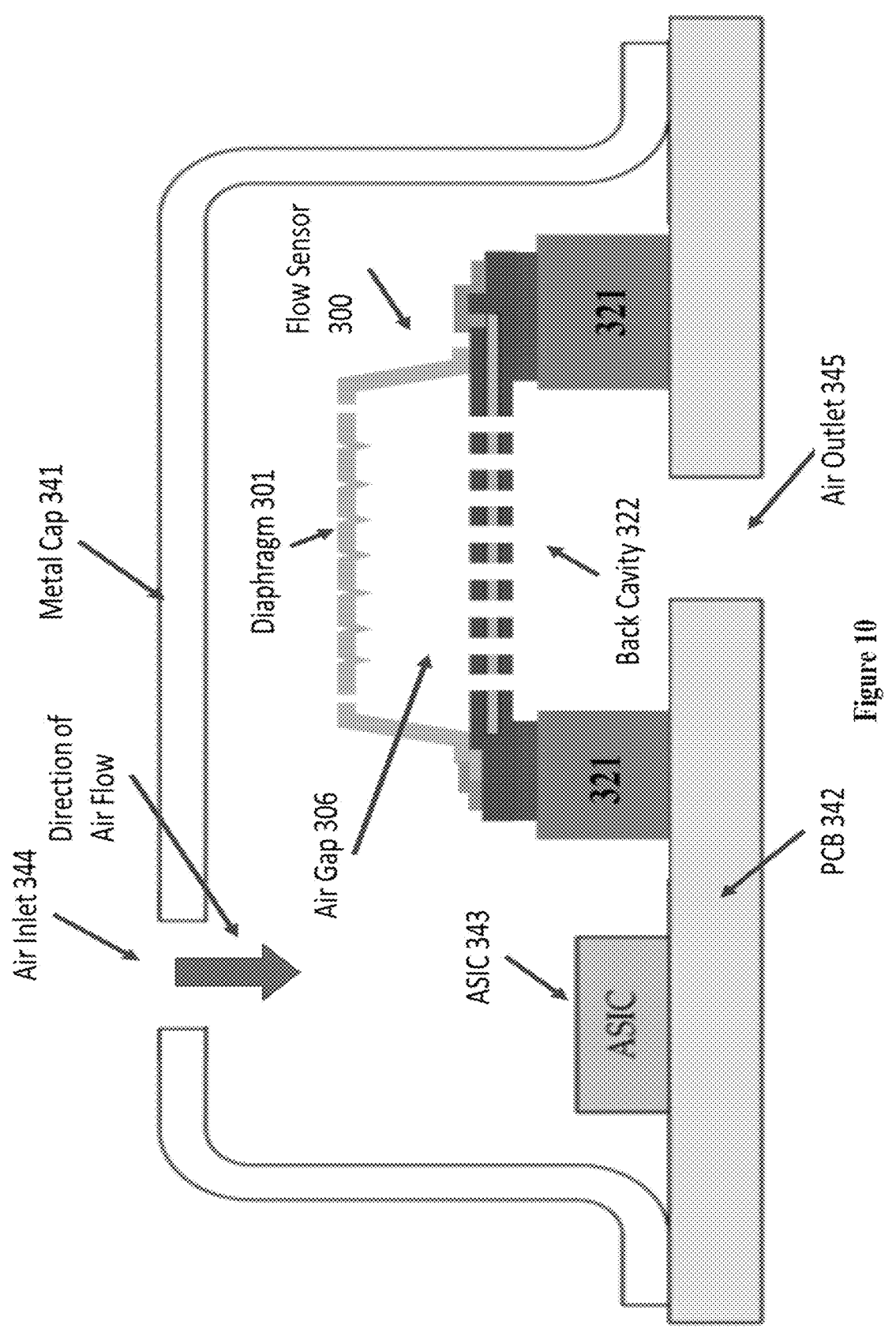
FIG. 10 illustrates a packaged capacitive flow sensor product using the micromachined capacitive flow sensor of FIG. 8.

As previously summarized, an aspect of the invention provides a packaged flow sensor product comprising the micromachined capacitive flow sensor as described above, which will not be repeated here for conciseness. In typical embodiments as shown in FIG. 10, the packaged flow sensor product may further include a gas/air inlet 344 and a gas/air outlet 345. A gas (e.g., air) flows into the sensor through the gas inlet 344 and exits the packaged flow sensor product through the gas outlet 345. The packaged flow sensor product may further include a metal cap 341 sealed to a printed circuit board (PCB) 342. The micromachined capacitive flow sensor as described above may be sealed between metal cap 341 and PCB 342. The gas inlet 344 is cut out on the metal cap 341, and the gas outlet 345 is cut out on the PCB 342. The substrate 321 is attached to the PCB 342 and the back cavity 322 of substrate 321 is made open, and thus in flow communication, to the gas outlet 345. An application-specific integrated circuit (ASIC) 343 may be mounted on the PCB 342 and encapsulated within the metal cap 341.

In FIG. 10, the flow sensor 300 having a diaphragm 301 and shallow corrugation 302, a sandwiched backplate 310, an air gap 306, a substrate 321 and a back cavity 322 is attached to the PCB 342. An ASIC 343 is placed on the PCB 342. In some applications, however, the ASIC 343 is not required as those skilled in the art understand. A metal cap 341 encapsulates the ASIC 343 and flow sensor 300 in the space/cavity formed by the metal cap 341 and PCB 342. An air inlet 344 is cut out on metal cap 341, and an air outlet 345 cut out on PCB 342. Thus, the air flows in from air inlet 344, passing through venting holes 304 on diaphragm 301, backplate holes 315 and back cavity 322, then finally exits from air outlet 345. When the air comes in, it always contacts the diaphragm 301 first before it passes through the backplate holes 315. In other words, the direction of air flow will always cause the diaphragm 301 to deflect towards the backplate 310.

Figure 11:
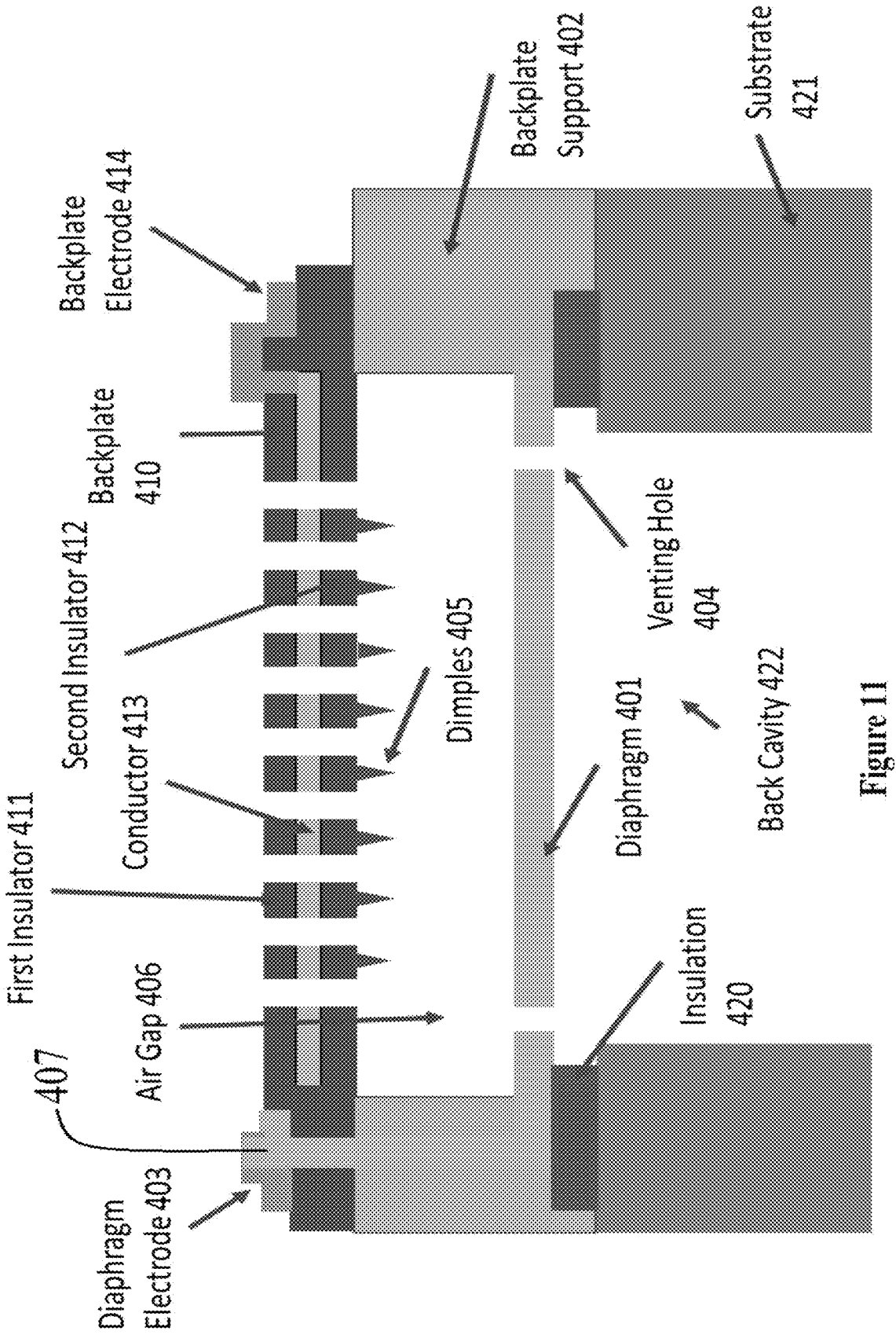
FIG. 11 shows the cross-sectional view of a micromachined capacitive flow sensor having a diaphragm supported by the substrate and the backplate spaced above the diaphragm in accordance with an exemplary embodiment of the present invention.

A different micromachined capacitive flow sensor according to another preferred embodiment of the present invention is illustrated in FIG. 11. The flow sensor includes a diaphragm 401 having venting holes 404 is fully anchored and supported on insulation 420, which itself is supported on the substrate 421. A back cavity 422 is cut out in substrate 421 and is right under the diaphragm 401. The diameter of venting hole 404 is typically on the order of a few micrometers, but not more than 20 um. A backplate 410 is placed at a distance above the diaphragm 401 and is supported by the backplate support 402. The backplate 410 is typically a sandwiched structure in which the first insulator 411 and the second insulator 412 encapsulate the conductor 413. The backplate 410 is perforated and has backplate holes 415 to allow the passage of air flow. The size of backplate holes 415 is usually 2 um to 10 um in diameter. There are also dimples 405 on the surface of second insulator 412 extending into the space of air gap 406. The dimples 405 are typically 0.2 um to 1.0 um in height, and 1.0 um to 5.0 um in diameter. An air gap 406 is formed between the diaphragm 401 and backplate 410. The conductor 413 is exposed at one end and a metal layer is coated at this end to make electrical contact and to form backplate electrode 414.

The diaphragm 401 is typically made of conductive material such as doped polysilicon. At one end of diaphragm 401, a through-via 407 is formed in backplate support 402 and backplate 410. A metal layer is coated at this end of the diaphragm 401 to make electrical contact and to form diaphragm electrode 403. A parallel plate capacitor is thus formed between the diaphragm 401 and backplate 410 spaced by an air gap 406.

Figure 12:
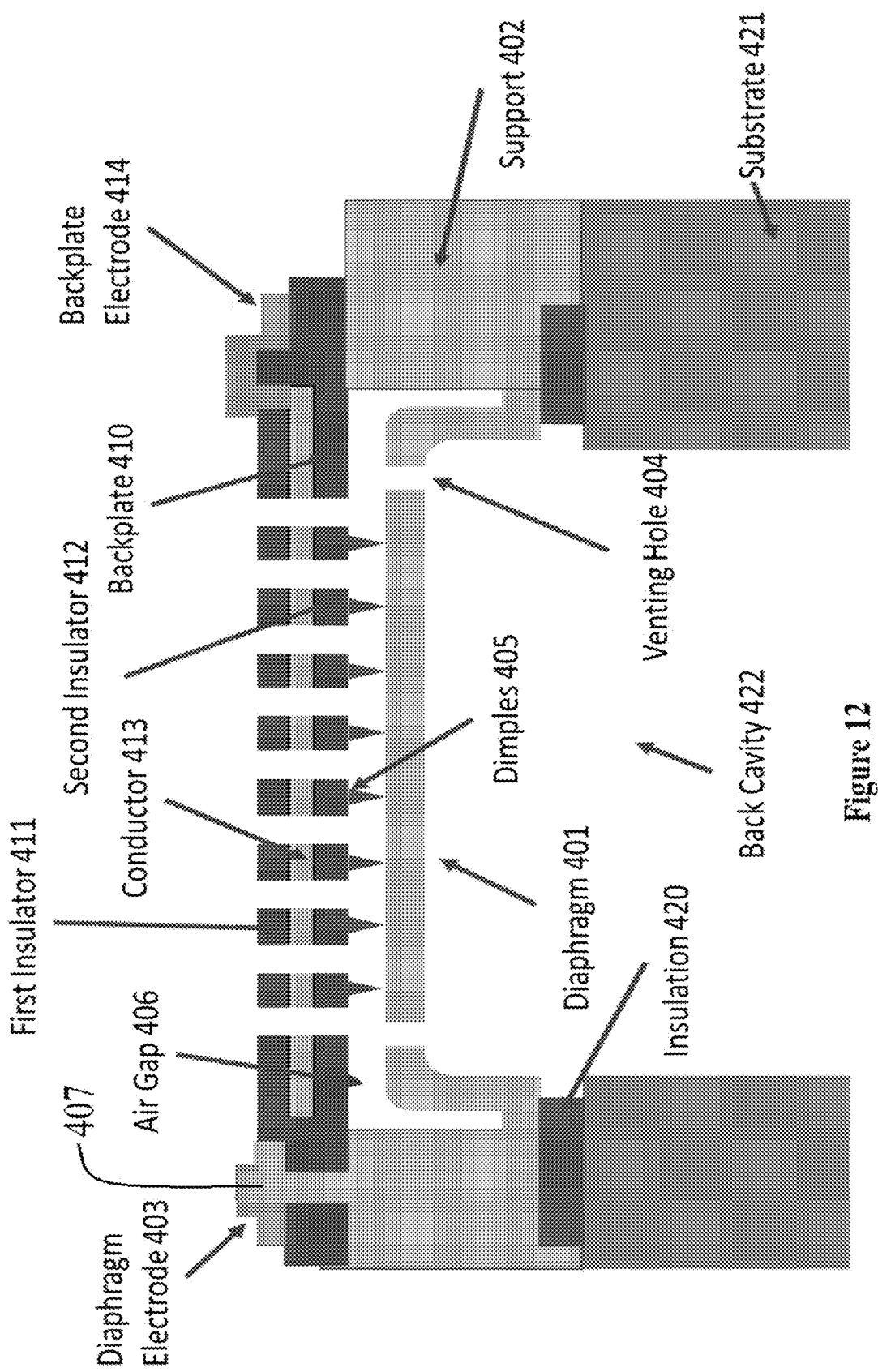
FIG. 12 shows the cross-sectional view of a micromachined capacitive flow sensor having a diaphragm supported by the substrate and the backplate spaced above the diaphragm, in which the diaphragm is pulled in against the backplate.

When the external pressure exerted by the sound and/or air flow on diaphragm 401, it typically deflects in response to the pressure. If the pressure is so large that it cannot be dissipated or equalized by the venting holes 404, the diaphragm 401 will be pressed towards the backplate 410. Assuming now there is an air flow passing through the back cavity 422, the venting holes 404, the air gap 406, and the backplate holes 415 in succession. If the air flow is larger than that can be dissipated through venting holes 404, the diaphragm 401 will deflect upward and move closer toward the backplate 410. This will reduce the air gap 406, and the capacitance of the capacitor so formed by the diaphragm 401 and backplate 410 will increase. As the air flow becomes faster and thus the pressure exerted onto the diaphragm 401 will also increase. Initially, this relationship is linear or quasilinear. In other words, the deflection of diaphragm 401 is in linear or quasilinear proportion to the pressure exerted onto diaphragm 401 by the air flow. When the air flow further increases and pressure exerted onto diaphragm 401 is more than the pull-in threshold of a membrane as discussed previously, the diaphragm 401 will be pulled in and rest on the backplate 410, as shown in FIG. 12. In this case, the diaphragm 401 is separated from the backplate 410 only by the height of dimples 405, which is also the height of air gap 406. It should be noted that in order to allow the occurrence of pull-in of diaphragm 401, the air gap 406 has to be made large enough, preferably about 1.2 to 2 times of pull-in depth under the electrostatic excitation. In other words, the classical voltage limitation (Vs) due to the instability of the electrostatic excitation shall be in a reasonable range.

When the diaphragm 401 in FIG. 12 is pulled in against the backplate 410 under the pressure exerted by the air flow, it is separated from the backplate 410 only by the dimples 405. The dimples 405 are typically made cone-shaped so that they are sharp at the end/tip to prevent the diaphragm 401 sticking to the backplate 410. To further increase the capacitance of the capacitor so formed by the diaphragm 401 and backplate 410, the second insulator 412 of the backplate 410 is usually made of materials having high dielectric constant, such as silicon nitride. When the diaphragm 401 snaps (upwardly) down to the backplate 410 and rests on the dimples 405 as the pressure of the air flow is over a set threshold. The capacitance of the variable capacitor so formed by the diaphragm 401, the air gap 406 and the backplate 410 jumps non-linearly as the diaphragm 401 pulls in. The capacitance of the variable capacitor at which point the diaphragm 401 snaps down to the backplate 410 is defined as the switching point of the packaged capacitive flow sensor product manufactured according to another preferred embodiment of the present invention, as illustrated in FIG. 13.

Figure 13:
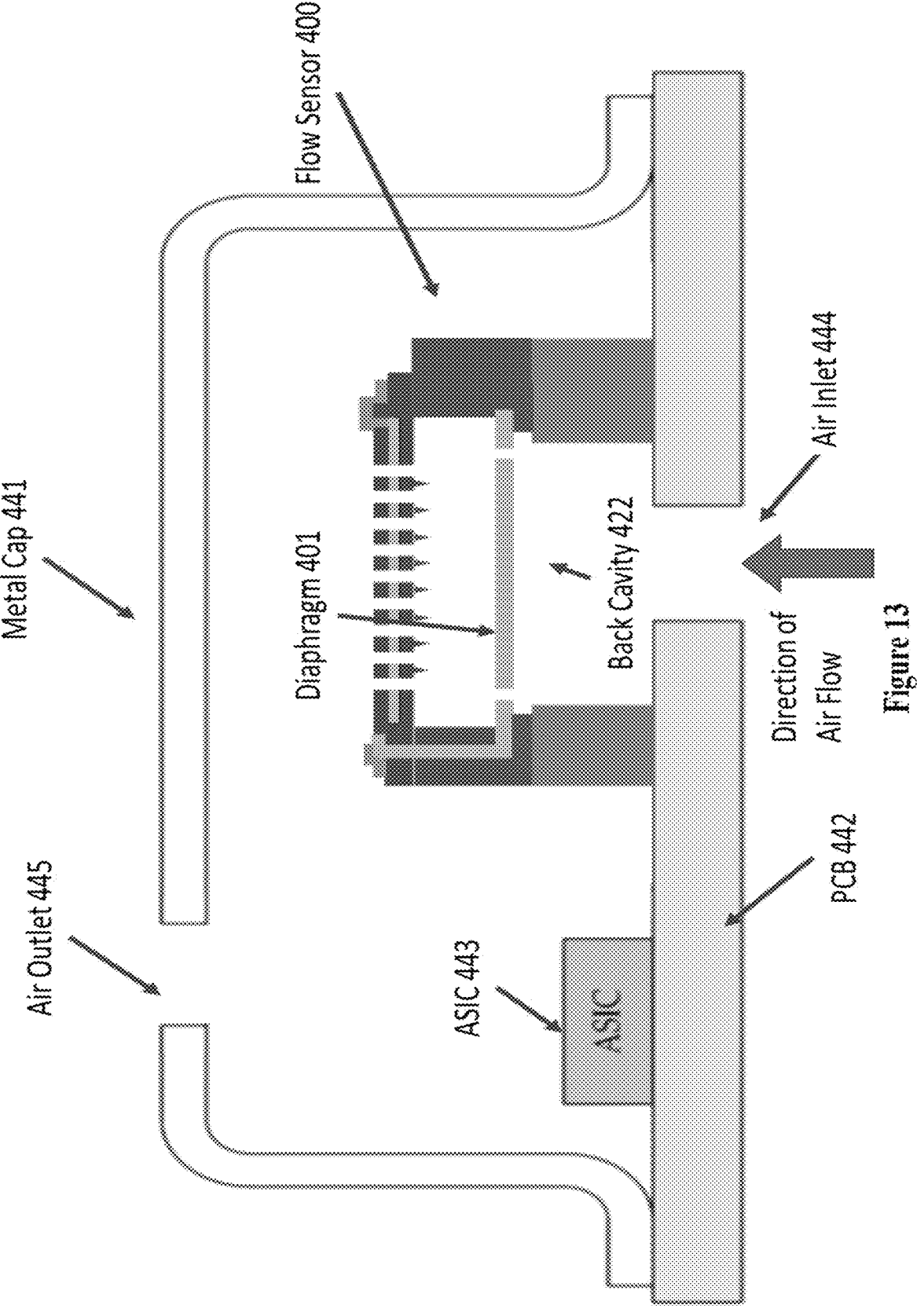
FIG. 13 illustrates of a packaged capacitive flow sensor product using the micromachined capacitive flow sensor of FIG. 11.

In the packaged micromachined capacitive flow sensor as shown in FIG. 13, the flow sensor 400 having a diaphragm 401, a sandwiched backplate 410, an air gap 406, a substrate 421 and a back cavity 422 is attached to the PCB 442. An ASIC 443 is placed on the PCB 442. In some applications, however, the ASIC 443 is not required as those skilled in the art understand. A metal cap 441 encapsulates the ASIC 443 and flow sensor 400 in the cavity formed by the metal cap 441 and PCB 442. An air inlet 444 is cut out on PCB 442, and an air outlet 445 cut out on the metal cap 442. Thus, the air flows in from air inlet 344, passing through the back cavity 422, the venting holes 404 on diaphragm 401 and the backplate holes 415, then finally exits from the air outlet 345 on metal cap 441. Therefore, when the air comes in, it always contacts the diaphragm 401 first before it passes through the backplate holes 415. In other words, the direction of air flow will always cause the diaphragm 401 to deflect towards the backplate 410.

Using micro-machining technology, the geometry of capacitive flow sensors manufactured according to preferred embodiments of the present invention can be precisely controlled, as can the mechanical response of the diaphragms. The consistency of the pull-in behavior of the diaphragms are also achievable employing the methods illustrated in the preferred embodiments above. Unlike a traditional pressure sensor where the response is strictly in linear proportion to the pressure force, the capacitive flow sensors manufactured according to preferred embodiments of the present invention exhibit the non-linearity when the diaphragm is pulled in. This pulse-like behavior allows for the easy detection of airflow pressure over a set threshold, thus making the flow switch desirable for an aerosol delivery device.

Figure 14:
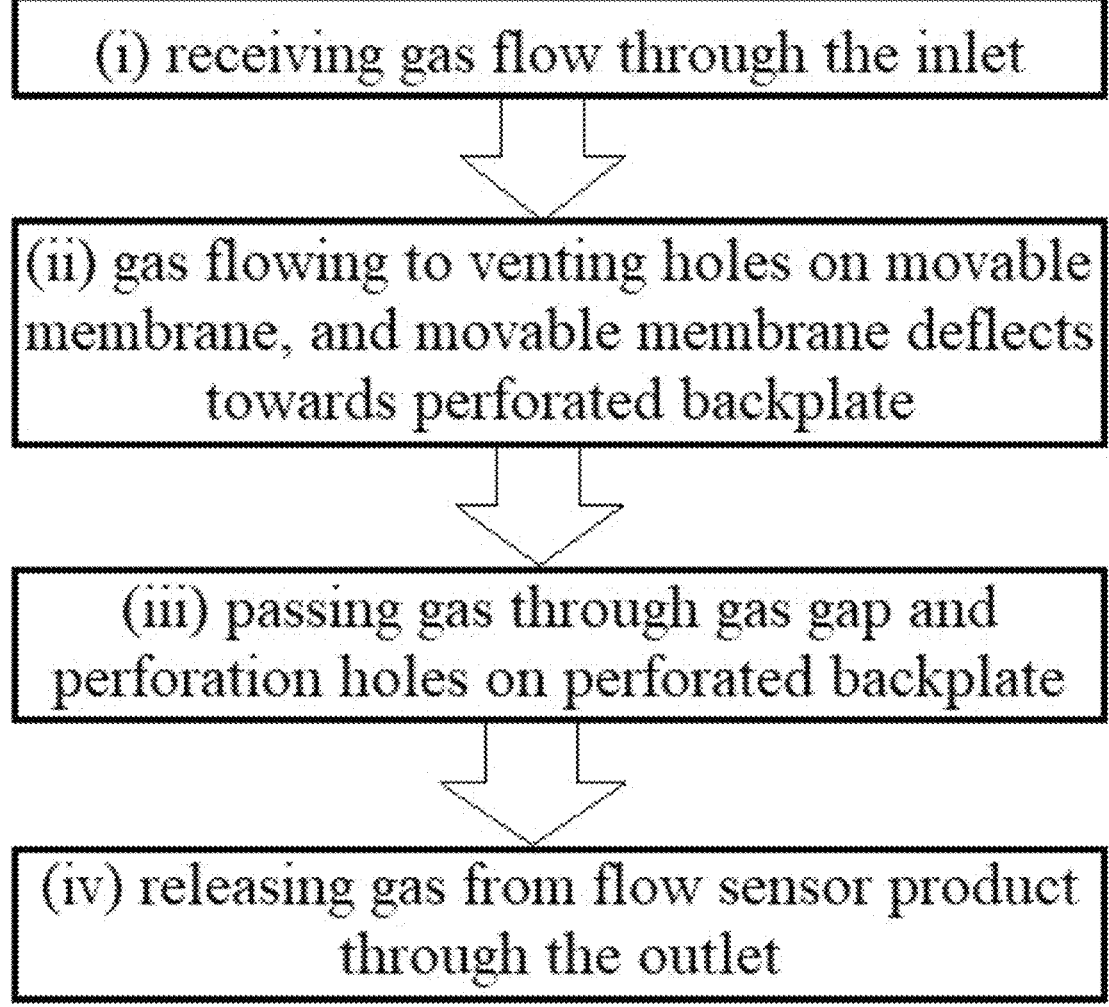
FIG. 14 is the flow chart of a method of using or operating the packaged flow sensor product in accordance with an exemplary embodiment of the present invention.

As shown in FIG. 14, the invention provides a general method of using or operating the packaged flow sensor product as described above. The method includes the following steps: (i) receiving a gas flow from outside of the packaged flow sensor product through the inlet; (ii) causing the gas to flow from the inlet to the venting holes on the movable membrane, wherein the gas flow pressures the movable membrane causing it to deflect towards the perforated backplate; (iii) passing the gas through the gas gap and the perforation holes or the through holes on the perforated backplate; and (iv) releasing the gas from the packaged flow sensor product through the outlet.

When the pressure of the gas flow exceeds a set threshold, the movable membrane snaps down to the perforated backplate, and the movable membrane and the perforated backplate are separated apart only by anti-stiction dimples between them. The capacitance of the variable capacitor increases or jumps non-linearly as the movable membrane pulls in. At a moment when the movable membrane snaps down to the perforated backplate and the movable membrane and the perforated backplate are separated apart only by anti-stiction dimples between them, the capacitance of the variable capacitor may be used as a value to trigger a switching action of the flow sensor product.

In the foregoing specification, embodiments of the present invention have been described with reference to numerous specific details that may vary from implementation to implementation. The specification and drawings are, accordingly, to be regarded in an illustrative rather than a restrictive sense.

The invention claimed is:

1. A micromachined capacitive flow sensor, comprising:
a movable membrane having one or more venting holes, and
a perforated backplate having perforation holes or through holes;
wherein the perforated backplate is spaced from, and in parallel with, the movable membrane;
wherein a gas gap (such as an air gap) is formed between the movable membrane and the perforated backplate;
wherein the movable membrane, the gas gap and the perforated backplate form a variable capacitor whose capacitance varies with a movement of the membrane relative to the perforated backplate; and
wherein the movable membrane and/or the perforated backplate have/has anti-stiction dimples extending into the gas gap.

2. The micromachined capacitive flow sensor according to claim 1, wherein the variable capacitor is supported on a substrate, and the substrate has a cavity formed below the variable capacitor to allow the gas such as air to flow through.

3. The micromachined capacitive flow sensor according to claim 1, wherein the anti-stiction dimples have a height of 0.2 um to 1.0 um, and a diameter of 1.0 um to 5.0 um.

4. The micromachined capacitive flow sensor according to claim 1, wherein the gas (such as air) gap formed by the movable membrane and the perforated backplate is larger than a pull-in depth of the movable membrane under electrostatic excitation.

5. The micromachined capacitive flow sensor according to claim 1, wherein the perforated backplate has a sandwich structure in which a first insulator and a second insulator encapsulate a conductor.

6. A packaged flow sensor product comprising the micromachined capacitive flow sensor according to claim 1, wherein the movable membrane and/or the perforated backplate in said micromachined capacitive flow sensor have/has anti-stiction dimples extending into the gas gap.

7. The packaged flow sensor product according to claim 6, wherein said micromachined capacitive flow sensor is so configured that the variable capacitor is supported on a substrate, and the substrate has a cavity formed below the variable capacitor to allow gas such as air to flow through.

8. The packaged flow sensor product according to claim 6, wherein the anti-stiction dimples have a height of 0.2 um to 1.0 um, and a diameter of 1.0 um to 5.0 um.

9. The packaged flow sensor product according to claim 6, wherein said micromachined capacitive flow sensor is so configured that the gas (such as air) gap formed by the movable membrane and the perforated backplate is larger than a pull-in depth of the movable membrane under electrostatic excitation.

10. The packaged flow sensor product according to claim 6, wherein the perforated backplate has a sandwich structure in which a first insulator and a second insulator encapsulate a conductor.

11. The packaged flow sensor product according to claim 6, further comprising a gas inlet and a gas outlet, wherein a gas flows into the sensor product through the gas inlet; then passes through the venting holes, the gas gap, and the perforation holes (or through holes) successively; and exits the sensor through the gas outlet.

12. The packaged flow sensor product according to claim 6, further comprising a metal cap sealed to a printed circuit board (PCB), wherein the micromachined capacitive flow sensor is sealed between the metal cap and the PCB.

13. The packaged flow sensor product according to claim 12, wherein the gas inlet is cut out on the metal cap, and the gas outlet is cut out on the PCB; or wherein the gas inlet is cut out on the PCB, and the gas outlet is cut out on the metal cap.

14. The packaged flow sensor product according to claim 13, wherein a substrate is attached to the PCB and a back cavity of the substrate is made open, and thus in flow communication, to the gas outlet/inlet on the PCB.

15. The packaged flow sensor product according to claim 12, further comprising an application-specific integrated circuit (ASIC) mounted on the PCB and encapsulated within the metal cap.

16. A method of using or operating the packaged flow sensor product according to claim 11, comprising:
(i) receiving a gas flow from outside of the packaged flow sensor product through the inlet;
(ii) causing the gas to flow from the inlet to the venting holes on the movable membrane, wherein the gas flow pressures the movable membrane causing it to deflect towards the perforated backplate;
(iii) passing the gas through the gas gap and the perforation holes or the through holes on the perforated backplate; and
(iv) releasing the gas from the packaged flow sensor product through the outlet;
wherein, when the pressure of the gas flow exceeds a set threshold, the movable membrane snaps down to the perforated backplate, and the movable membrane and the perforated backplate are separated apart only by anti-stiction dimples between them.

17. The method according to claim 16, wherein the capacitance of the variable capacitor increases or jumps non-linearly as the movable membrane pulls in; and wherein the capacitance of the variable capacitor, at a moment when the movable membrane snaps down to the perforated backplate and the movable membrane and the perforated backplate are separated apart only by anti-stiction dimples between them, is a value that triggers a switching action of the flow sensor product.

* * * * *